United States Patent Office 2,815,356
Patented Dec. 3, 1957

2,815,356

METHOD OF RENDERING FAT

Charles Pavia, Timberville, Va., assignor to Pavia Process, Inc., Washington, D. C., a corporation of Delaware No Drawing. Application August 18, 1954, Serial No. 450,816

1 Claim. (Cl. 260—412.6)

This invention relates to fat rendering and is more particularly concerned with improvements in the Pavia method of rendering fat.

The Pavia method of rendering fat has been in commercial use for a number of years and it yields a superior quality of lard as proven by United States Government findings (Rendering lard at low temperatures, by Swift and Hankins, Bureau of Animal Industry, Agricultural Research Administration, United States Department of Agriculture, Beltsville, Maryland, published in Food Technology, 1952, vol. VI, No. 5, pages 161–165). As a result of these official findings, the popularity of the Pavia process has steadily increased and it is now being used by a number of meat packing companies in the United States and other countries.

The Pavia process is commercially used at present by grinding chilled fat through a ⅛ inch plate directly into a steam jacketed open kettle equipped with high speed agitators and heated with steam in the jacket under a pressure of the order of 80 pounds per square inch, equivalent to a temperature of about 325° F.

The time of rendering is very rapid and is usually completed in about 10 to 15 minutes in batches varying from about 500 to 3000 pounds. The rendered fat is promptly emptied from the kettle before the batch temperature rises above the boiling point of water and is then immediately filtered.

The residual tissue is water absorbent, like a sponge, and carries the water. Consequently, if the fat is filtered therefrom in an open filter, the water is retained in the tissue. Open filtering, however, while wholly suitable for many operations, is not altogether suitable for others. In the first place, the filtering time is too long, requiring sometimes as much as 30 minutes to an hour. Also, in open filtering, the fat cools upon exposure to the ambient air, its viscosity increases and the efficiency of filtering is markedly decreased.

Numerous attempts have been made to reduce the time of filtering and increase the efficiency. These attempts included the use of hydraulic presses, expellers, screw presses, centrifuges, etc., none of which were found to be satisfactory. The material, which has a consistency resembling wet oatmeal, is difficult to handle and presents problems entirely new to the industry.

It was generally regarded from the outset by experts in the field and experienced renderers, that it would be impractical, if at all possible, to utilize a filter press. This theory was based on the difficulty in using a filter press with ordinary cracklings, such as those obtained from the ordinary open kettle method of rendering or by dry rendering. It was generally regarded that the difficulty with ordinary cracklings would be greatly aggravated in the case of the Pavia tissue residue because of its slippery nature and the tendency for it to pack tight without voids. This theory appeared to be so sound that the idea of using a filter press for the Pavia tissue residue was discarded as being the least practical of all others.

Recently, however, I have discovered, contrary to general belief, that it is entirely possible to filter out the Pavia tissue residue with a filter press, if the fat is passed through the press quickly and at a temperature sufficiently high to maintain a relatively low viscosity. Temperatures of the order of at least 200° F. were found to be satisfactory.

The reason for this is not entirely understood and I do not, therefore, wish to be limited to any specific explanation. Those who have witnessed this phenomena are astounded by it.

This development, however, was so significant, that it was immediately placed in commercial use by companies using the Pavia process. As a result of this development, extremely high yields are being obtained and the residue tissue left in the press is very dry.

However, in utilizing a filter press for this purpose, it was found that water contained in the spongy tissue was forced out by the pressure of the press. The moisture content of the filtered fat was, consequently, too high in many cases for satisfactory keeping qualities, and it had to be removed. Removal can be readily accomplished by settling, centrifuging, boiling out, flash dehydration, refiltering with the addition of water absorbent agents, etc. However, these methods require additional handling of the fat and additional equipment, and sometimes, additional materials, such as absorbent agents.

The general object of the present invention is the provision of a method which will solve this water problem when a filter press is used without the addition of any other equipment, that is, by the use of the three basic pieces of equipment, namely, the grinder, the kettle, and the filter press.

In accordance with this invention, the fat is rendered as in the case of the Pavia process, but the batch, consisting of the rendered fat and the floating tissue therein, after the rendering is substantially completed, is given an additional heat treatment of very short duration to expel the water absorbed by the tissue, the while maintaining rapid agitation of the batch. The temperature of the batch is permitted to rise above 212° F. whereupon water in the particles is boiled off. This boiling off is permitted to proceed to the point where moisture is still retained in the tissue particles, but in an amount of which little, if any, can be expressed by the action of the filter press or in which the amount expressed will not result in the filtered fat having a moisture content above 0.5%, the limit under most Government specifications, this being known as the "press point" or "press level." For good keeping qualities, fat should have a low moisture content to prevent souring. The boiling out of any major portion of the free water naturally in the raw fatty tissue is sufficient to bring the moisture content to a satisfactory level. Should the batch contain any extraneous water, the presence of which, however, should be avoided whereby possible, it would be necessary to boil off this excess also in addition to the major portion of the free water naturally held in the raw fat. In other words, the tissue should not contain free water in excess of a minor portion of the free water naturally contained in the raw fat. The retention of some moisture in the tissue is important in order to prevent or minimize burning or scorching of the tissues, because such burning or scorching would impart an undesirable odor and flavor to the fat. Satisfactory results have been obtained when moisture retained in the tissues just prior to pressing, is in the range of about 2 to 15%.

Thus, typically, 600 pounds of pork fat consisting of an equal mixture of leaf and back fat was ground through a ⅛ inch plate in a standard meat grinder and dropped into a steam jacketed open kettle equipped with high speed planetary agitators. The pressure in the steam jacket was maintained at 80 lbs. per square inch. At the end of 11 minutes, the fat was completely rendered and analysis showed that substantially all the water has absorbed in the tissue particles. Instead of shutting off the steam in the jacket at this point, as is customarily done in the Pavia process, and passing the contents of the kettle into the filter press, the steam was permitted to stay on for an additional period. The temperature of the batch rose above 212° F. and frothing was evident on the surface. As soon as the frothing subsided or gave evidence of subsiding, which was about 3 to 4 minutes later, the steam to the jacket was cut off and the contents of the kettle passed into the filter press. Analysis showed that the filtered fat was practically dry, having a moisture content of only about 0.04%. The tissue residue was of a light tan color and it had a moisture content of about 2%. The residue tissue was highly water absorbent and when placed in water became a soft, white mass, of spongy texture, substantially the same as the tissue residue customarily obtained by the ordinary processing under the Pavia process and suitable for use as an ingredient in manufactured meat products.

In a similar test, the steam was permitted to stay on only an additional 2½ minutes after rendering was completed. The moisture content of the fat was found to be 0.27% after separation by the filter press.

It was also found that the residue could be dessicated and then ground to an impalpable powder for use, like salt or spices, as an additive to foods to impart a delicate flavor as well as nutritional values.

Having thus described my invention, I claim:

The method of rendering particles of comminuted fat tissue having a moisture content above 15%, said method consisting essentially of applying to the particles, while agitating them, heat from a constant source having a temperature of about 300° F., continuing the application of heat from said source for a period of time to cause the fat to be rendered substantially completely and the temperature of the fat reaches a temperature between substantially 180° F. and the boiling point of water, then holding the batch in contact with the heat source until the temperature of the batch rises above the boiling point of water and the moisture content of the batch falls within the range of 2 to 15% and without the formation of cracklings, then promptly removing the batch from contact with the heat source and subjecting it while hot to the action of a pressure filter.

References Cited in the file of this patent

UNITED STATES PATENTS

| | | |
|---|---|---|
| 1,654,506 | McTavish | Dec. 27, 1927 |
| 2,467,529 | Hormel | Apr. 19, 1949 |
| 2,616,910 | Pavia | Nov. 4, 1952 |